May 11, 1965   G. MÜLHAUPT   3,182,513
RAILWAY CAR HAVING INDEPENDENTLY ROTATING WHEELS AND GUIDING RIM
Filed May 28, 1962
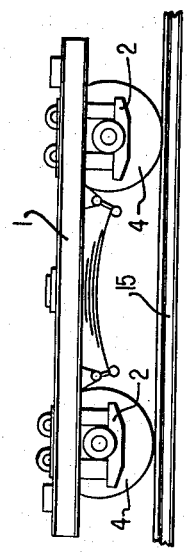
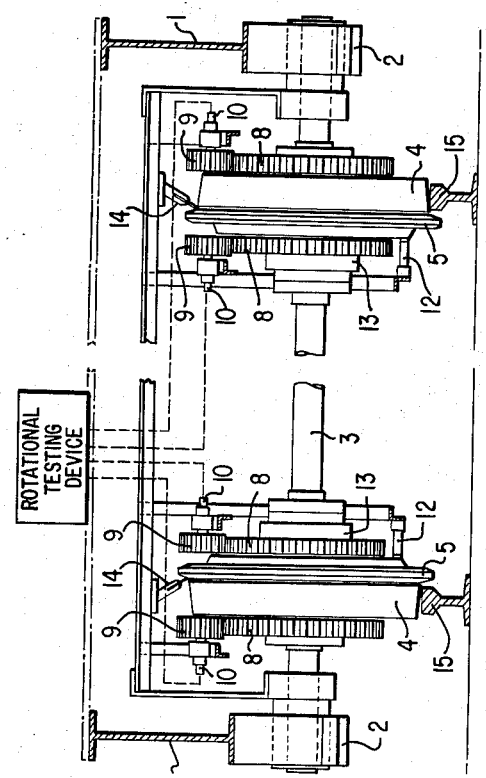
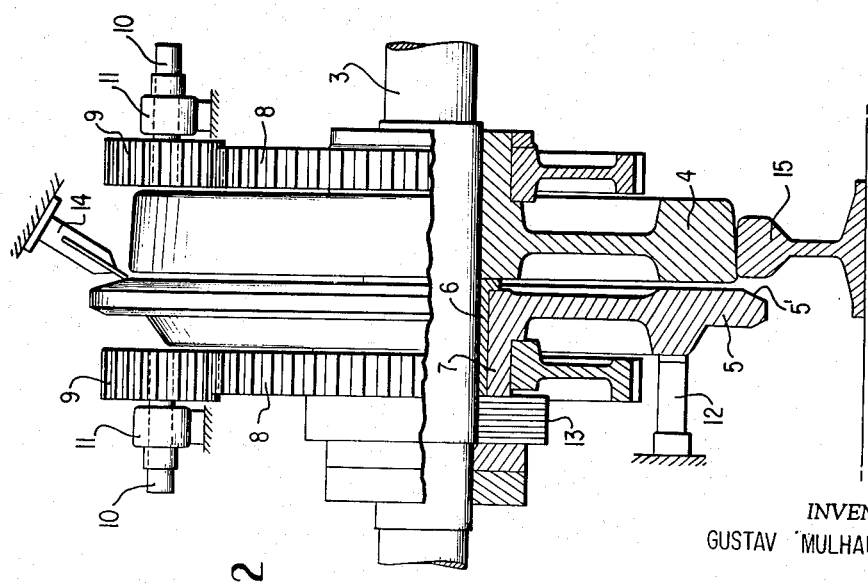
INVENTOR
GUSTAV MULHAUPT
BY
ATTORNEY United States Patent Office 3,182,513
Patented May 11, 1965

3,182,513
RAILWAY CAR HAVING INDEPENDENTLY
ROTATING WHEELS AND GUIDING RIM
Gustav Mülhaupt, Oberemattstrasse 64, Pratteln,
Basel, Switzerland
Filed May 28, 1962, Ser. No. 198,253
Claims priority, application Switzerland, May 30, 1961,
6,318/61
1 Claim. (Cl. 73—514)

The invention relates to a chassis for vehicles having wheels with a guiding rim, particularly rail vehicles. The purpose of the invention is to provide a construction which reduces the friction between rail and wheel, so that the rail and the rim are preserved. The invention also provides a novel guiding rim structure mounted for rotation independently of the mounting of the wheel to the axle, and associated with said guiding a toothed wheel which gears with pinion devices to adapt the rim, gear and pinion for measurement of the rotary speed of the rim, which makes it possible to measure the rim friction and certain forces dependent thereon. The use of the proposed chassis enables the state of the rails to be checked in conjunction with the resistance to motion in straight stretches, curves and changes of gradient.

Apart from being used in rail vehicles, the chassis may also be applied to travelling cranes, bridge cranes, aerial ropeways, immobile ropeways and air-cushion vehicles having solid or rubber-sprung wheels or wheels with pneumatic tires.

The chassis according to the invention is characterised in that each wheel is equipped with at least one guiding rim which is mounted for rotation independently of the wheel body. It is desirable for means to be provided for measuring the relative speed of the wheel body and the guiding rim.

An example of the invention is illustrated in the accompanying drawing, in which:

FIG. 1 is a diagrammatic longitudinal view of a railway underframe,

FIG. 2 is a wheel of the underframe, shown half in section and half in elevation, and FIG. 3 is a single end view in elevation to show the wheels and guiding rims connected to the rotational testing device.

According to the example illustrated, the chassis of a rail vehicle is provided with a chassis frame 1, in which pairs of wheels 2 are resiliently mounted in the usual manner. The detailed construction of a wheel can be seen from FIG. 2 whereby the numeral 3 is applied to identify the wheel axle carrying the wheel 4. The wheel 4 is mounted on the axle 3 in fixed relation thereto so as to rotate therewith and reference numeral 15 is a rail upon which the pair of wheels shown in FIG. 1 rides.

Unlike known constructions, the wheel 4 has no integral rim member and there is provided a separate rim in the form of a disc 5 which is mounted in parallel alignment on the inner side of the wheel 4 by means of a special mounting construction consisting of the hub portion 7 extending inwardly at right angles to the disc 5 and a friction bearing 6 which is attached to the axle 3 so as to be adapted for rotation on the axle 3. The disc 5 which is so mounted on the bearing 6 can thus turn or be turned independently of the axle 3 and of the wheel 4. The hub portion of the disc 5 is fitted wtih a toothed gear 8 which cooperates with pinions 9. The pinions 9 are rotatably connected to shafts 10 which are accommodated in bearings 11 and each shaft 10 may be connected to a known rotational testing device which is commercially available and is specifically adapted for measuring the rotary speed of the rim 5. Rigidly secured to the wheel 4 is a second toothed wheel meshing with further pinions 9 connected to further shafts 10. This arrangement permits the rotary speed of the wheel 4 to be determined by these known means identified as rotational testing devices in FIG. 3.

The disc 5 is under the influence of a mechanical stop or damper 12, which lies on the underside of the chassis and can be hung from the vehicle body and is placed alongside the disc 5 to prevent swinging thereof.

A pressure meter 13 may be provided to measure the axial forces acting on the disc 5.

A clearing knife or disc 14 may be provided to remove foreign bodies from the gap between the wheel body 4 and the rim disc 5.

The relative movement between the wheel body 4 and the disc 5 will vary according to the running conditions of the rail vehicle on the rails. The movement of the rim disc 5 is influenced under the usual variations in running conditions so that the synchronous running between the axle 3 and the disc 5 is disturbed to permit a measurement of the axial forces acting on disc 5 or the rotary speed of the wheel body 4 so that valuable information is gained.

It should be pointed out that the wheel body 4 may be equipped with radial springing, for example by rubber or steel members. It is also possible to provide a wheel with pneumatic tires, in which case the associated, independently rotating rim disc has a recess in the region of the tire, so that enough room is left if the tire is deformed, for example through air escaping or the air pressure dropping, for the tire not to come into contact with the rim.

It should finally be mentioned that the wheel may also be equipped with two rims mounted for relative rotation on each side of the wheel body, so that they are able to contact the rail from both sides.

According to the frictional resistance arising temporarily between the friction surface 5' of the disc 5 and the lateral friction surface of the rail 15, the disc 5 will either be stationary relatively to the axle 3, or rotate or oscillate about the axle 3. The rotary speed is adapted to the temporary relative movement between the disc and the rail, independently of the speed of the wheel body 4.

One advantage of the chassis described is that the noise due to friction virtually disappears, particularly at bends, and wear caused by friction is appreciably reduced. Another advantage of the chassis is that the danger of derailment is greatly reduced, since when the axle is obliquely positioned and there are rolling movements the rim disc does not readily run up onto the rail, but instead turns backwards in the opposite direction to the wheel body at the beginning of the mounting movement and runs down again.

What I claim is:

A chassis for rail vehicles having an axle, a wheel fixedly mounted to each end of said axle, a projecting rim member mounted on said axle on the inner side of and immediately adjacent to each of said wheels which serves as a guiding rim for the wheel on the rails, a hub extending from the top of said rim member, a friction bearing surrounding said axle which mounts said hub and rim member inwardly from each wheel and parallel to each wheel so that each guiding rim member is mounted for rotation independently of said axle and independently of the wheel body alongside, a first toothed gear which is fixedly mounted on said axle and on the outside of each of said wheels, a second toothed gear which is fixedly mounted to the hub of said rim on the inside of each of said rim members, first pinions mounted above said axle on the outside of each of said wheels on said chassis which are engaged by said first toother gears, second pinions mounted on said chassis above said axle on the inside of each of said rim members which are engaged by said second toothed gears, a shaft for each of the aforesaid pinions, bearings accommodating each of said shafts, and rotational testing devices connected to said shafts for measuring the rotational speed of said rim member.

References Cited by the Examiner

UNITED STATES PATENTS

| 734,609 | 7/03 | Porter | 104—245 |
|---|---|---|---|
| 805,427 | 11/05 | Porter | 295—9 |
| 1,369,839 | 3/21 | Rowe | 295—9 |
| 2,038,146 | 4/36 | Cook et al. | 303—21 |
| 2,092,381 | 9/37 | Stewart | 105—61 |
| 3,050,016 | 8/62 | Fischer | 105—215 |

MILTON BUCHLER, *Primary Examiner.*

LEO QUACKENBUSH, *Examiner.*